3,227,659
TREATMENT OF EXHAUST GASES USING AN ALUMINA BASE ALKALI METAL PHOSPHORUS-CONTAINING COMPOUND
John T. Brandenburg and Robert J. Leak, Wappingers Falls, N.Y., assignors to Texaco Inc., New York, N.Y., a corporation of Delaware
No Drawing. Filed June 28, 1962, Ser. No. 205,846
3 Claims. (Cl. 252—437)

This invention relates to a method for the treatment of exhaust gases from internal combustion engines operated with fuel containing lead compounds. In another of its specific aspects, this invention relates to the structure employed in such treatment of exhaust gases and to the method of preparing the structure.

Internal combustion engines generally operate at fuel-air mixtures which are richer than stoichiometric, with the result that in the exhaust products of combustion there are residual combustible compounds including carbon monoxide, hydrogen and hydrocarbons. In recent years, automotive exhaust gas pollution control has become exceedingly important, and numerous methods have been proposed for promoting the oxidation of the combustible compounds in the exhaust gas system. For this purpose, catalytic afterburners or catalytic combustion chambers have been employed in the exhaust system, which generally comprise a catalyst impregnated on a ceramic or refractory base.

In order to increase the octane rating of the fuel, an organic lead compound, such as tetraethyllead, is often added to motor fuels. The lead compounds contained in the exhaust products from the engine operated on such fuels adversely affect many oxidation catalysts which might be employed in exhaust systems thereby decreasing the activity of the catalysts in a relatively short period of time.

It is an object of our invention to provide in the treatment of exhaust gases containing lead compounds both a method and structure for substantially removing the lead compounds from the exhaust gases, and also, in combination therewith, for the catalytic oxidation of combustible compounds in the exhaust gases. Still another object is to provide a method of preparing the structure of the above type. These together with other objects and advantages will be apparent to one skilled in the art upon reading the following description.

The novel structure of our invention involves broadly a substrate, preferably of extended dimensions, having an adherent film or layer of alumina formed thereon. The film of alumina deposited or formed on the substrate is sufficiently tenacious to withstand ordinary usage and is not damaged or impaired upon relatively severe abrading, jarring, etc. A phosphorus-containing compound or material is deposited on the alumina film adhering to the substrate. The exhaust gases emitted from the engine contact the phosphorus-containing material. The lead compounds contained in the exhaust gases react with the phosphorus-containing material, and the resulting reaction products are retained on the alumina film. The exhaust gases being substantially free or depleted in lead compounds are then contacted with a suitable oxidation catalyst, which is susceptible to lead poisoning, to effect oxidation of the combustible compounds, as explained more fully hereinbelow. In accordance with the preferred embodiment of our invention, the structure comprises two parts or divisions in that a part of the substrate bearing the alumina film is impregnated with the phosphorus-containing material, and the other part or remainder of the substrate bearing the alumina film is impregnated with the oxidation catalyst. The structure is arranged in the exhaust system such that the exhaust gases first contact the phosphorus-containing material, and thereafter contact the oxidation catalyst. In this manner, the lead compounds which would otherwise poison the catalyst are substantially removed before contacting the oxidation catalyst thereby greatly extending the life of the catalyst.

Where deemed desirable, air may be admixed with the exhaust gases to promote the catalytic oxidation of the combustibles. Air may be added at any desirable position such as at the exhaust manifold, muffler or exhaust pipe. It is preferable that air be admixed with the exhaust gases after the gases have contacted the phosphorus-containing material and before contacting the oxidation catalyst.

In accordance with this invention, a substrate is provided with an adherent film of alumina formed by contacting the substrate with a solution of an alkali metal aluminate, e.g., sodium aluminate. The substrate is preferably of extended dimensions, and is particularly of a length and geometric surface area substantially greater than that of discrete particles. The substrate employed in the structure of our invention is not restricted to any particular configuration nor to any particular material. The substrate may be formed of a metal or non-metal, and may include such materials as steel, stainless steel, nickel, or titanium, including sintered metal materials, or refractory or ceramic materials including, for example, high melting glass, refractory metal oxides, e.g., magnesia and silica, or refractory metal silicates or carbides. The configuration of the substrate may include bars, balls, chain, mesh, plates, saddles, sheet, tubes, wire or the like.

Although the invention is described herein in detail with reference to employing a sodium aluminate solution, it should be understood that a solution of potassium aluminate is also satisfactory for use in forming an adherent film of alumina on the substrate.

In preparing the structure, the substrate is contacted with an aqueous solution of sodium aluminate whereby an adherent film of alumina is formed thereon, the resulting film being hard, firm and tenacious. X-ray diffraction analysis indicates that the alumina formed or deposited from the sodium aluminate solution is chiefly the trihydrate phase, either as the alpha or beta trihydrate phase. The particular phase initially deposited onto the substrate appears to be largely dependent on the temperature of the sodium aluminate solution employed. Thus, solutions at about room temperature result in the formation of a film comprising about 50% by weight alpha alumina trihydrate and 50% by weight beta alumina trihydrate; whereas, employing sodium aluminate solutions at elevated temperatures, e.g., 125° F. or higher, generally results in a film comprising alpha alumina trihydrate. The phase of hydrated alumina formed on the substrate may be significant in that further transformation of the alumina may be effected where desired, upon dehydration on heating or mild calcination, as explained below in detail. However, the alumina film formed on the substrate may contain a small quantity of some other phase or phases of alumina, as well as several tenths percent sodium oxide (which may be present as sodium aluminate). It should be understood, however, that the alumina film initially deposited on the substrate may be regarded as substantially a hydrate of alumina, and is intended to embrace the film formed on the substrate from a solution of sodium aluminate, which film may undergo additional phase transformation.

The sodium aluminate solution may be obtained or prepared by any known methods. Thus, for example, aluminum pellets may be dissolved in a relatively strong solution of sodium hydroxide, or, where deemed desirable, alumina may be dissolved in an aqueous solution of sodium hydroxide. The substrate is contacted with the resulting solution of sodium aluminate, and for a sufficient period of time, whereby an adherent film of alumina is formed on the surface of the substrate. Generally, the concentration of the sodium aluminate solution should not be less than 0.5 molar, and more preferably 1 molar, in order for a film of alumina deposited or formed be of sufficient depth to be serviceable and be formed within a reasonable period of time. Generally, a solution having a concentration of about 1 to 5 molar is satisfactory. Where desired, more concentrated solutions may be employed but there appears to be no advantage in employing solutions having concentration greater than 30 molar. Although a solution of sodium aluminate at room temperature may be used, formation of the alumina film is somewhat facilitated by contacting the substrate with a solution of sodium aluminate maintained at an elevated temperature. However, as explained above, the temperature of the solution determines to a considerable extent the particular alumina phase formed. Thus, for example, in depositing a film of alpha alumina trihydrate on the substrate it is desirable to employ a solution having a temperature above 125° F., and more preferably about 175 to 212° F.

The substrate may be contacted with the solution of sodium aluminate as by immersing the substrate when in particulate form, e.g. saddles, spheres, mesh, etc., in the solution; or in forming the alumina film on the interior wall of a tube of substantial length, sodium aluminate solution is added to the tube and permitted to stand therein in a vertical position in order to provide for a film of uniform thickness. The resulting film of alumina formed on the substrate should be of sufficient thickness to provide adequate capacity for retaining the catalyst deposited thereon. To insure adequate performance under the conditions encountered, however, the film of alumina formed should not be substantially thinner than about 1 mil, and preferably not less than about 10 mils, usually 10 to 100 mils being desirable.

In the preferred embodiment of this invention, the alumina in hydrate form deposited on the substrate as an adherent film is subjected to heating to drive off at least part of the water of hydration thereby resulting in the transformation to a lower state, or degree, of hydration and also to a higher density alumina. Such transformation accompanying heating is well known in the art, and may be found discussed in "Alumina Properties," by J. W. Newsome et al. (Aluminum Company of America, 1960, Second Revision). The temperature required in effecting transformation of the hydrate of alumina depends on such factors as pressure, atmosphere, heating rate and impurities. Thus, for example, both alpha alumina trihydrate and beta alumina trihydrate deposited from a solution of sodium aluminate, as explained above, may be dehydrated to the monohydrate phase upon mild calcining in an atmosphere of air to about 390 to 750° F. and at slightly elevated pressure. The resulting monohydrate phase may be subjected to further heating to about 1000 to 1500° F. thereby transforming it to the gamma phase. On the other hand, betal alumina trihydrate may be transformed to eta alumina upon heating in dry air at a slow rate to about 550 to 950° F. Transformation to gamma alumina or eta alumina is particularly advantageous in that these phases have a large total surface area per unit weight, the surface area being substantially higher than the amorphous forms of alumina, thereby increasing the catalytic activity, per se, and, more importantly, resulting in a carrier characterized by a high adsorptive property.

The alumina film formed on the substrate serves as a support or carrier for a phosphorus-containing compound, and also, in the preferred embodiment of our invention, for an oxidation catalyst material. It should be understood, however, that the alumina coated substrate need not serve as a carrier for the oxidation catalyst. In this embodiment, the oxidation catalyst, which may be supported by alumina pellets, diatomaceous earth, silica gel, or the like, is incorporated in the exhaust system downstream of the phosphorus-containing compound. In accordance with the preferred embodiment, however, where the substrate exists as a single, continuous unit, the alumina film is formed over the entire substrate, and then a portion of the alumina film is impregnated with the phosphorus-containing material and the remainder of the alumina film is impregnated with the oxidation catalyst material. On the other hand, the substrate may be provided as two separate sections, with each section bearing an alumina film, and one section impregnated with the phosphorus-containing material, and the other section with the oxidation catalyst material. As a further modification, a packed column or chamber may be employed with a portion of the packer having alumina formed thereon is provided with the phosphorus-containing material and the remainder of the packer is impregnated with the oxidation catalyst. The structure is positioned or arranged in the exhaust system of the internal combustion engine such that the exhaust gases emitted therefrom first contact that part of the structure having the phosphorus-containing material deposited thereon. The lead compounds in the exhaust gases react with the phosphorus-containing material and the resulting product is retained on the alumina film. In this manner, substantially all of the lead compounds are removed from the exhaust gases which are then contacted with the oxidation catalyst to oxidize the combustible compounds. If the lead compounds are not removed from the exhaust gases prior to contacting the oxidation catalyst, the catalyst is readily poisoned. Thus, removal of the lead compounds from the exhaust gases extends the life of the catalyst substantially.

The phosphorus-containing material may be impregnated on the alumina film by contacting the alumina with a solution containing a compound of phosphorus. This is usually accomplished by immersing the alumina coated substrate in a solution of a salt of the phosphorus-containing material.

The phosphorus compounds found particularly useful include the alkali metal phosphates and the alkaline earth metal phosphates, and more preferably the acid phosphates of these metals which react readily with the lead compounds present in exhaust gases. When the alumina film is impregnated with phosphoric acid, the resulting phosphate deposit is too easily swept from the carrier by the exhaust gases under the high temperature conditions existing in exhaust systems. For this reason it is preferable to use in acid salt of a phosphate compound which, upon deposition on the alumina film is more retentive than phosphoric acid, and also reacts readily with the lead compounds. Phosphate compounds found to be particularly useful include the sodium dihydrogen phosphate, disodium hydrogen phosphate, sodium phosphate, and mixture thereof, and their alkaline earth counterparts. The temperature of the phosphate solution employed usually is at about room temperature, and may range from about 40° F. to 200° F., and preferably 50 to 100° F.

The alumina coated substrate having a phosphate deposit thereon is desirably dried in air at a temperature approximating that of an exhaust system of an internal combustion engine for the purpose of conditioning the structure. For this purpose, the impregnated alumina film may be air dried at a temperature of from about 500 to 1200° F., but a longer period of time is generally required when drying is conducted at the lower temperature. Thus, for example, when drying at 500° F. about 4 hours is adequate; whereas, drying at 1200° F., 1 hour is sufficient. Where required, the impregnation step, and drying operation, may be repeated to assure an adequate deposit of the phosphorus-containing material. It will be observed that the amount of phosphorus-containing material deposited on the alumina film may be varied over a large range and will depend largely upon the requirements of the engine and the type fuel employed in operating it.

The method utilized in depositing or impregnating the oxidation catalyst material upon the alumina coated substrate is dependent to some extent upon the particular catalyst material employed. In one method, a metal-containing catalyst material is deposited by chemically reducing a solution containing a soluble compound of the catalyst material in the presence of the substrate bearing the alumina film under such conditions as to effect a substantially uniform deposition of the catalyst material upon the alumina surface. Although the exact form of the deposit of catalyst material cannot be definitely determined, it is believed that the material is deposited from solution as elemental metal or its intermediate product of reduction, such as an oxide. Chemical reduction of the deposit is particularly useful in those instances where the elemental metal or its intermediate product of reduction, exhibits the required catalytic activity, or where a deposit of the metal may be rendered active upon subsequent treatment. In several cases, a compound of the metal forms with a stabilizing agent a soluble complex which may be readily reduced to the elemental metal or its intermediate product of reduction with a suitable reducing agent, preferably a reducing gas, for example, hydrogen. Suitable stabilizing agents include complexing agents which form soluble complex ions of the co-ordinate complex type, sequestering agents, chelating agents, dispersants and detergents. Thus, for example, compounds or salts of numerous metals useful in preparing oxidation catalysts form with ammonia a coordination type complex. Elements found to be useful in the preparation of the catalyst in accordance with our invention include copper, silver, zinc, chromium, vanadium, manganese, cobalt, molybdenum, tungsten, nickel, platinum and iron, and combinations thereof. More preferably, the metals include those from the group consisting of Group VIII and Period 4 of the Periodic Table of Elements. The metals from Group VIII include, for example, nickel, platinum, iron and cobalt and combinations thereof, and those metals from Period 4 include, for example, copper, vanadium, chromium, manganese, cobalt and nickel, and combinations thereof. The deposit is generally heated or calcined at a suitable temperature for purposes of conditioning the catalyst.

The non-metallic ions and anions of the metal compound or salt to be precipitated from the solution containing the metal or metals may be of any inorganic acid or strong organic acid which forms a soluble salt of the metal and is not reduced under precipitation conditions. Those anions generally employed include sulfate, chloride, nitrate, carbonate, and acetate. The solvent generally used is an aqueous solution, but suitable organic solvents including alcohols, aldehydes, ethers, ketones, toluene and pyridine may be used as may liquid ammonia.

Although ammonia is the preferred stabilizing agent, and the invention is described in greater detail in connection with solutions of this type, certain other stabilizing agents may be employed. Other suitable stabilizing agents include the organic primary, secondary and tertiary amines, such as methyl amine, ethylene diamine, diethylene triamine. In addition, stabilizing agents may include phosphates, especially pyrophosphate, and metaphosphate, as well as citrate, acetate, oxalate, tartrate, o-phenanthroline, thiocyanate, thiosulfate, thiourea, pyridine, quinoline and cyano groups. Still further useful complex formations include the chloro, hydroxo and aquo complexes, such as the aquo-ammonia complexes. Olefin and olefin-like compounds are also useful, and may include for example, ethylene, propylene, butadiene, etc., as well as the unsaturated cyclic compounds such as cyclohexene and styrene. However, the olefin and olefin-like compounds are desirably employed in non-aqueous solvent, for example, benzene, toluene, pyridine, acetone and ether.

The catalyst material is deposited upon the surface of the extended substrate by the action of a reducing agent, preferably hydrogen, on a solution containing a soluble complex of the catalyst material, such as an ammoniacal solution of a salt of the catalyst material. The concentration of the particular metal in solution will depend to a considerable extent upon the metal employed. Generally there appears to be no benefit from employing concentrations in excess of about 5 molar, but the concentration of a metal in solution should be less than that at which a substantial amount will precipitate out in particulate form which may be determined by experiment by one skilled in the art. A concentration of less than about 0.01 molar is usually too low for effecting reduction within a reasonable period of time. We have found a concentration of 0.5 to 2 molar to be generally satisfactory, but with the more rare or expensive elements, the concentration may be advantageously as low as 0.04 molar. The temperature and pressure employed in the reducing step depend somewhat upon the material undergoing reduction and may vary over a wide range. However, reduction proceeds advantageously at elevated temperatures usually within a range of from about 250 to 500° F., and under a partial pressure of from about 300 to 4000 pounds per square inch or higher. Although higher temperatures and pressures may increase slightly the plating phenomenon, this increase generally is not practical.

It should be understood that other reducing gases, such as carbon monoxide, may be used with satisfactory results, as may other reducing agents, such as hydrazine, hydroxylamine, glyoxal, formaldehyde and sulfur dioxide.

As an alternative procedure, the added oxidation catalyst material may be impregnated on the alumina film by contacting the oxide coated substrate with a solution containing the catalyst material. Generally, this is accomplished by immersing the alumina coated substrate in a solution of a salt of the catalyst material. The conditions for impregnating i.e., concentration, temperature, time and pH, will depend largely upon the material employed and upon the amount of catalyst material required. Although aqueous solutions are usually employed, the catalyst material may be impregnated on the alumina carrier from a non-aqueous solution particularly acetone, ethanol and the like. The deposit is than calcined and activated in place as by oxidizing, reducing, sulfiding, etc. By this method, the alumina film may be impregnated with such catalyst materials as salts or compounds of such metals as copper, silver, zinc, chromium, vanadium, maganese, cobalt, tungsten, nickel, platinum and iron, and combinations thereof. More preferably, the metals include those from the group consisting of Group VIII and Period 4 of the Periodic Table of Elements. The metals from Group VIII include, for example, nickel, platinum, iron and cobalt and combinations thereof, and those metals from Period 4 include, for example, copper, vanadium, chromium, manganese, cobalt and nickel, and combinations thereof.

In still another method, the oxidation catalyst material may be deposited on the alumina film by pasting as from a slurry of the material. For example, copper oxide, chromium oxide or zinc oxide may be pasted on the alumina coated substrate, and then calcined at a suitable temperature for purposes of conditioning the catalyst.

In order to assure deposition of the desired quantity of the catalyst material, it may be necessary in some cases to repeat the particular process employed in depositing the material, including the successive steps of deposition, and drying or activation where required. It should be understood that two or more metal-containing catalyst materials may be deposited on the alumina film. For example, copper and chromium may be co-deposited from a solution of their nitrate salts. The co-deposits may be then calcined or otherwise activated. In this manner, a co-deposit of copper and chromium results in a catalyst material comprising copper chromite.

Where metal is employed as the material for the extended substrate, the structure of our invention having the phosphorous-containing material and oxidation catalyst material deposited thereon functions substantially as an isothermal surface. During the catalytic oxidation of exhaust gases, heat transfer from the catalyst bed is readily accomplished by means of the extended metal substrate. During the initial starting period when the operating temperature is low, heat is conducted throughout the structure thereby bringing it up to operating temperatures. On the other hand, when the temperature is high, heat transfer rates are greater and the metal substrate will conduct the heat to the surroundings thereby facilitating dissipation of heat. Thus, the metal substrate provides an adequate means for controlling the temperature conditions. An aggregate of metal wire mesh was found to be particularly advantageous in that it also provides a relatively high geometric surface area and relatively high turbulence.

When deemed desirable the structure of our invention may be contained in a chamber which in turn is inserted into the muffler or exhaust pipe. In another embodiment of our invention, the structure is provided in substantially tubular form of relatively small inside diameter, and made preferably from metal, e.g. steel. The inside diameter of the tubular member, in general, may range from about 0.05 inch to 2 inches, preferably 0.25 to 1 inch, but is dependent somewhat upon the combustion system. The alumina film is formed on at least one surface or wall of the tubular member, and the alumina film is impregnated with the phosphorus-containing material and preferably an oxidation catalyst material, as described above. The tubular member should be of a length sufficient to accomplish the desired removal or depletion of lead compounds from the exhaust gases and the catalytic oxidation of the combustible compounds. A number of parallel tubes housed in a single unit may be employed, and the tubes incorporated into the muffler. The number of tubes should be adequate for a correct residence time for the exhaust gases. Where desired, the tubular structure may comprise a portion or all of the exhaust pipe.

The following example illustrates our invention as employed in the exhaust system of an internal combustion engine.

*Example I*

A sodium aluminate solution was prepared by dissolving 600 grams of sodium hydroxide in 7 liters of water contained in a battery jar, and adding thereto 400 grams of aluminum pills. Two metal mesh cartridges (identified hereafter as cartridge A and cartridge B) were prepared as follows:

Round 6 mil metal knitted mesh consisting of a nickel-chromium-iron alloy and marketed under the trademark Inconel by Metal Textile Corp., was wrapped on a stainless steel screen measuring 3 inches by 10 inches and was then rolled into a cylindrical cartridge. Both cartridges measured 3 inches in length and 2 inches in diameter. Cartridge A weighed 72 grams, and cartridge B weighed 75 grams.

Both cartridges were immersed in the sodium aluminated solution. The solution was maintained at about 150° F., and the cartridges remained in the solution for 20 hours in order that the metal mesh might be uniformly coated with alumina. The cartridges were then removed from the solution, and washed thoroughly with water. The cartridges, having an adherent film of alumina formed thereon, were dried first at 300° F. for 1 hour, then at 500° F. for 1 hour, and finally at 1000° F. for 1 hour. As a result of the drying and heating, the alumina film comprised essentially gamma alumina. The total weight of cartridge A was 117 grams, the alumina film weighing about 45 grams; and for cartridge B, the total weight was 124 grams, the alumina film weighing about 49 grams.

The alumina film formed on cartridge A was impregnated with a phosphate deposit as follows:

11 grams of sodium dihydrogen phosphate were dissolved in 50 milliliters of water. The metal mesh cartridge A was immersed in the solution for 10 minutes, the temperature of the solution being about 70° F. The cartridge was removed from the solution and then heated in air at 300° F. for 2 hours. About ½ of the solution was adsorbed by the alumina. The process was repeated to adsorb the remainder of the solution. The cartridge was then dried at 500° F. for 2 hours and at 1000° F. for 2 hours. The total weight of the cartridge was 123 grams.

The alumina film formed on cartridge B was impregnated with a vanadium oxide catalyst as follows:

The solution of catalyst containing material was prepared by first dissolving 230 grams oxalic acid in 1700 milliliters of water. To this solution was added 100 grams of ammonium vanadate, and the resulting solution was diluted to 2000 milliliters. The metal mesh cartridge was immersed in 225 milliliters of the resulting solution for 10 minutes at about 70° F., and the solution then drained. The cartridge was then heated at 300° F. for 2 hours in air. This procedure was repeated 6 times. After the final soaking, the treated cartridge was heated in air at 300° F. for 1 hour, then at 500° F. for 2 hours and subsequently at 1000° F. for 2 hours. The total weight for the cartridge was 130 grams.

The above-prepared structure consisting of the two cartridges was evaluated for use in the exhaust system of an ASTM-Coordinating Fuel Research engine (a single cylinder engine) using premium grade motor gasoline containing about 2.2 milliliters of tetraethyl lead per gallon. In making the evaluation, two runs were conducted. In the first run, the prepared cartridges A and B were inserted end to end in a chamber 6 inches in length and having an inside diameter of 2 inches. The chamber was then inserted downstream of the engine, and was positioned so that cartridge A having deposited thereon the phosphate was on the upstream side of the exhaust system. The second run, which served as a blank, was substantially the same except that a cartridge measuring 6 inches by 2 inches having an alumina film formed thereon and impregnated with vanadium oxide only was evaluated in place of the two 3 inch by 2 inch cartridges. An analysis of the exhaust gases for each run was made with a flame ionization analyzer and detector manufactured by the Carad Corp. The activity, expressed as percent reduction in hydrocarbon, dropped after being on stream for about 42 hours from 41% to 28% for the system employing the phosphate structure, and from 41% to 17% for the blank run, thereby showing the beneficial action of the structure of our invention.

We claim:
1. A structure for use in an exhaust system of an internal combustion engine operated with fuel containing lead compounds which comprises:
   a non-porous support;
   an adherent film of alumina formed on said support by
      (a) contacting said support with an aqueous solution of an alkali metal aluminate, said solution temperature being 125° to 212° F. and said alkali metal aluminate concentration being not less than 0.5 molar, for a sufficient period of time to form an adherent film of alumina in hydrate form having a thickness of between 10 and 100 mils,
      (b) then separating said support and said solution, and,
      (c) finally, heating said support and said adherent film of alumina in hydrate form to remove water of hydration from the alumina; and a phosphorus-containing compound selected from the group consisting of sodium dihydrogen phosphate and di-sodium hydrogen phosphate deposited on said resulting film of alumina.

2. A structure according to claim 1 wherein said support is metal wire.

3. A structure according to claim 1 wherein said support comprises a tubular structure comprising a plurality of tubes having inside diameters within the range of 0.25 to 1 inch and wherein said film of alumina is formed on the inner surfaces of said tubes.

References Cited by the Examiner
UNITED STATES PATENTS

| 1,716,481 | 6/1929 | Bilsky | 23—2.2 |
| 2,290,211 | 7/1942 | Schaad | 252—437 X |
| 2,742,437 | 4/1956 | Houdry | 252—477 X |
| 3,025,133 | 3/1962 | Robinson et al. | 23—2.2 |

OTHER REFERENCES

Jacobson: Encyclopedia of Chemical Reactions, Rheinhold Publishing Company, New York, N.Y., 1946, vol. I, p. 171.

MAURICE A. BRINDISI, Primary Examiner.